US011794250B2

(12) United States Patent
Shuck et al.

(10) Patent No.: US 11,794,250 B2
(45) Date of Patent: Oct. 24, 2023

(54) FUSED FILAMENT FABRICATION WITH ELONGATED PARTICLES

(71) Applicant: Rolls-Royce Corporation, Indianapolis, IN (US)

(72) Inventors: Quinlan Yee Shuck, Indianapolis, IN (US); Robert Frederick Proctor, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 174 days.

(21) Appl. No.: 17/212,672

(22) Filed: Mar. 25, 2021

(65) Prior Publication Data

US 2022/0305558 A1    Sep. 29, 2022

(51) Int. Cl.
| | |
|---|---|
| *B22F 10/18* | (2021.01) |
| *B33Y 10/00* | (2015.01) |
| *B33Y 80/00* | (2015.01) |
| *B28B 1/00* | (2006.01) |
| *B33Y 70/00* | (2020.01) |

(52) U.S. Cl.
CPC .............. *B22F 10/18* (2021.01); *B28B 1/001* (2013.01); *B33Y 10/00* (2014.12); *B33Y 70/00* (2014.12); *B33Y 80/00* (2014.12)

(58) Field of Classification Search
CPC ........ B22F 10/18; B22F 1/0007; B33Y 10/00; B33Y 70/00; B33Y 80/00; B28B 1/001
See application file for complete search history.

(56) References Cited

U.S. PATENT DOCUMENTS

| | | | |
|---|---|---|---|
| 7,628,099 B2 | 12/2009 | Mann et al. | |
| 8,381,845 B2* | 2/2013 | Lockwood | .............. C22C 29/06 |
| | | | 175/428 |
| 10,099,427 B2 | 10/2018 | Mark et al. | |
| 10,518,490 B2 | 12/2019 | Wicker et al. | |
| 2006/0243107 A1* | 11/2006 | Mann | .................... B23B 29/125 |
| | | | 408/1 R |
| 2014/0154088 A1 | 6/2014 | Etter et al. | |

(Continued)

OTHER PUBLICATIONS

Novotny et al. ("3D printing in turbomachinery: Overview of technologies, applications and possibilities for industry 4.0." Turbo Expo: Power for Land, Sea, and Air 58677 (2019): V006T24A021.) (Year: 2019).*

(Continued)

*Primary Examiner* — Sally A Merkling
*Assistant Examiner* — Ricardo D Morales
(74) *Attorney, Agent, or Firm* — Shumaker & Sieffert, P.A.

(57) ABSTRACT

In some examples, a method for additive manufacturing an article, the method including depositing a filament via a filament delivery device to form at least one track of the deposited filament, the at least one track of the deposited filament forming at least a portion of a preform article, wherein the filament includes a sacrificial binder and a powder, wherein the powder includes a plurality of elongated particles with each respective particle defining a longitudinal axis, wherein the longitudinal axes of the plurality of particles are substantially aligned with each other within the at least one track of the deposited filament; removing substantially all the binder from the at least one track of the preform article to form a powder article; and sintering the powder article to form a sintered article.

20 Claims, 5 Drawing Sheets

(56) References Cited

U.S. PATENT DOCUMENTS

2014/0361460 A1* 12/2014 Mark .................. B33Y 50/02
264/248
2017/0252812 A1* 9/2017 Mykulowycz ......... B33Y 40/10
2019/0084243 A1* 3/2019 Wilenski ............... B33Y 10/00

OTHER PUBLICATIONS

Ivey et al., "Characterizing Short-Fiber-Reinforced Composites Produced Using Additive Manufacturing," Advanced Manufacturing: Polymer & Composites Science, vol. 3, No. 3, Jun. 26, 2017, pp. 81-91.

Todaro et al., "Grain Structure Control During Metal 3D Printing by High-Intensity Ultrasound," Nature Communications, Jan. 9, 2020, vol. 11, No. 142, 9 pp.

Sungkhaphaitoona et al., "Influence of Process Parameters on Zinc Powder Produced by Centrifugal Atomisation," Materials Research, vol. 20, No. 3, Mar. 11, 2017, pp. 718-724.

* cited by examiner

FUSED FILAMENT FABRICATION WITH ELONGATED PARTICLES

TECHNICAL FIELD

The disclosure relates to additive manufacturing techniques.

BACKGROUND

Additive manufacturing generates three-dimensional structures through addition of material layer-by-layer or volume-by-volume to form the structure, rather than removing material from an existing volume to generate the three-dimensional structure. Additive manufacturing may be advantageous in many situations, such as rapid prototyping, forming components with complex three-dimensional structures, or the like. In some examples, additive manufacturing may include fused deposition modeling or fused filament fabrication, in which heated material, such as polymer, is extruded from a nozzle and cools to be added to the structure.

SUMMARY

The disclosure describes example techniques, systems, materials, and compositions for additively manufacturing of articles using fused filament fabrication.

In some examples, the disclosure relates to a method depositing a filament via a filament delivery device to form at least one track of the deposited filament, the at least one track of the deposited filament forming at least a portion of a preform article, wherein the filament includes a sacrificial binder and a powder, wherein the powder includes a plurality of elongated particles with each respective particle defining a longitudinal axis, wherein the longitudinal axes of the plurality of particles are substantially aligned with each other within the at least one track of the deposited filament.

In some examples, the disclosure relates to an article comprising a composite structure on a substrate, the composite structure formed by at least one track, wherein the at least one track is formed by depositing a filament via a filament delivery device, wherein the filament includes a sacrificial binder and a powder, wherein the powder includes a plurality of elongated particles with each respective particle defining a longitudinal axis, wherein the longitudinal axes of the plurality of particles are substantially aligned with each other within the at least one track of the deposited filament.

In some examples, the disclosure relates to an additive manufacturing system comprising a filament delivery device; and a computing device configured to control the filament delivery device to deposit a filament on a surface to form at least one track of the deposited filament, the at least one track of the deposited filament forming at least a portion of a preform article, wherein the filament includes a sacrificial binder and a powder, wherein the powder includes a plurality of elongated particles with each respective particle defining a longitudinal axis, wherein the longitudinal axes of the plurality of particles are substantially aligned with each other within the at least one track of the deposited filament.

The details of one or more examples are set forth in the accompanying drawings and the description below. Other features, objects, and advantages will be apparent from the description and drawings, and from the claims.

DETAILED DESCRIPTION

The disclosure generally describes techniques for forming additively manufactured components such as components for high temperature gas turbine engines using fused filament fabrication (FFF). Additive manufacturing of metal or alloy components may present unique challenges, for example, compared to additive manufacturing of polymeric components. For example, while techniques such as powder bed fusion (including direct metal laser sintering, electron beam melting, selective laser sintering, or the like) which use a directed energy beam to fuse and sinter material may be useful in additive manufacturing, some alloys may respond to energy beams in a manner that may not be conducive to localized melting or localized sintering. Further, powder bed fusion may leave residual unfused or unsintered powder residue, for example, within channels or hollow internal passages of an additively manufactured component. Powder bed fusion of high temperature alloys may also result in components that may be prone to cracking due to localized melting and thermal gradients.

In some examples, a material including a sacrificial binder and a powder including metal, alloy, and/or other material dispersed in the binder may be deposited using fused filament fabrication to form an additively manufactured component. After additively forming one or more layers of the component, or after forming the entire component, the binder may be selectively removed or sacrificed from the layers or the component, for example, using heating, chemical dissolution, or the like. Sacrificing the binder from the layers or the component may leave substantially only the powder in the layers or the component. The component may be further treated, for example, by sintering, to strengthen or densify the powder and form the additively manufactured component. By using the material including the sacrificial binder and the powder, removing the sacrificial binder, and sintering the powder, high-melt temperature alloys may be used, residual (free) powder may be reduced, and crack propensity may be reduced due to the absence of melting. Further, microstructure of the additively manufactured component may be more carefully controlled by controlling microstructure of the powder and avoiding melting of the powder during processing.

In some examples, during the additive manufacturing process, the powder and sacrificial binder may be provided in the form of a filament, and the filament may be deposited as a track onto a build surface (e.g., defined by a substrate or another underlying track) by a filament delivery device.

The filament delivery device may be controlled to deposit one continuous track or a plurality of tracks to form a three-dimensional (3D) article, e.g., with the track(s) of filament forming rows and columns of the 3D article. In some examples, the powder dispersed in the binder of the filament may be include metallic particles that are substantially spherical in geometry so that the filament is highly flowable out of the filament delivery device. In such an example, the specific orientation of the particles within the filament may not generally influence the properties of the component resulting from the filament deposited as a track by the filament delivery device, e.g., leading to isotropic properties in the sintered component.

In accordance with examples of the present disclosure, an additive manufacturing process may include deposit a filament including a powder and binder with a filament delivery device, where the powder includes a plurality of elongated particles. The elongated particles may each define a longitudinal axis, where the longitudinal axis of the respective particles are aligned with each other within a track that is formed by depositing the filament. For example, the elongated particles may be aligned such that the longitudinal axis of the particles are substantially aligned with the longitudinal axis of the track (e.g., along the deposition or toolpath) as it is deposited by the filament delivery device. The one or more deposited tracks may form a preform article, from which the binder is removed and the article is sintered to form a sintered article. Thus, by controlling the toolpath used to deposit the track, the alignment of the elongated particles within the preform article and subsequent sintered article may be controlled. In this manner, the one or more properties of exhibited as a result of the aligned elongated particles may be selectively imparted to the sintered article using such a technique.

In some examples, substantially all of the tracks deposited by a filament delivery device to form a component with the tracks (e.g., following binder removal and sintering) may include elongated particles aligned within the tracks. In other examples, the deposition process may be tailored such that only portions of the final sintered article may be formed by tracks including aligned elongated particles. In this manner, all or portions of a final article may exhibit one or more properties that result from the alignment of the elongated particles within the deposited tracks, such as, e.g., increased creep strength at high temperatures in the alignment direction of the elongated particles and/or increased hoop creep strength at high temperatures. As noted above, one or more properties of the final sintered article may be tailored by controlling the toolpath of the filament deposition device, e.g., to control which portions of the final article are formed of track(s) containing aligned elongated particles and/or control the alignment of the elongated particles relative to the geometry of the final article. As one example, when forming a vane for use in a turbine engine, a radial or otherwise curvilinear toolpath may be used when depositing the filament to build the vane as compared to a linear toolpath.

The filament manufacturing process and/or the additive manufacturing process may cause the elongated metal particles to align, resulting in a textured particle orientation. For example, instead of a random orientation, metallic grains from the deposited tracks may have a preferred crystallographic direction. The crystals may not all point in the exact same orientation, but there may be a "texture" with a preferred orientation. In some examples, the elongated particles may be aligned within the filament prior to the filament being supplied (e.g., extruded) out of the filament delivery device. Alternatively, or additionally, the filament delivery device may be configured such that elongated particles within are binder are aligned with each other when being deposited, e.g., by shear forces acting on the elongated particles when the filament is extruded out of the filament delivery device.

The elongated particles may be metal, alloy, and/or ceramic in composition. In some examples, a filament may include a combination of both elongated and non-elongated (e.g., substantially spherical) particles, with the elongated particles being aligned within the track formed by the filament deposition as described herein. The ratio of elongated to non-elongated particles within a filament may be controlled (e.g., increased, decreased, held substantially constant) during the filament deposition process to tailor the properties of the final component (e.g., with different ratios providing different properties within the volume of the final component). Similarly, the aspect ratio of the particles within a filament may be controlled (e.g., increased, decreased, held substantially constant) during the filament deposition process to tailor the properties of the final sintered component (e.g., with aspect ratios providing different properties within the volume of the final sintered component).

Figure 1:
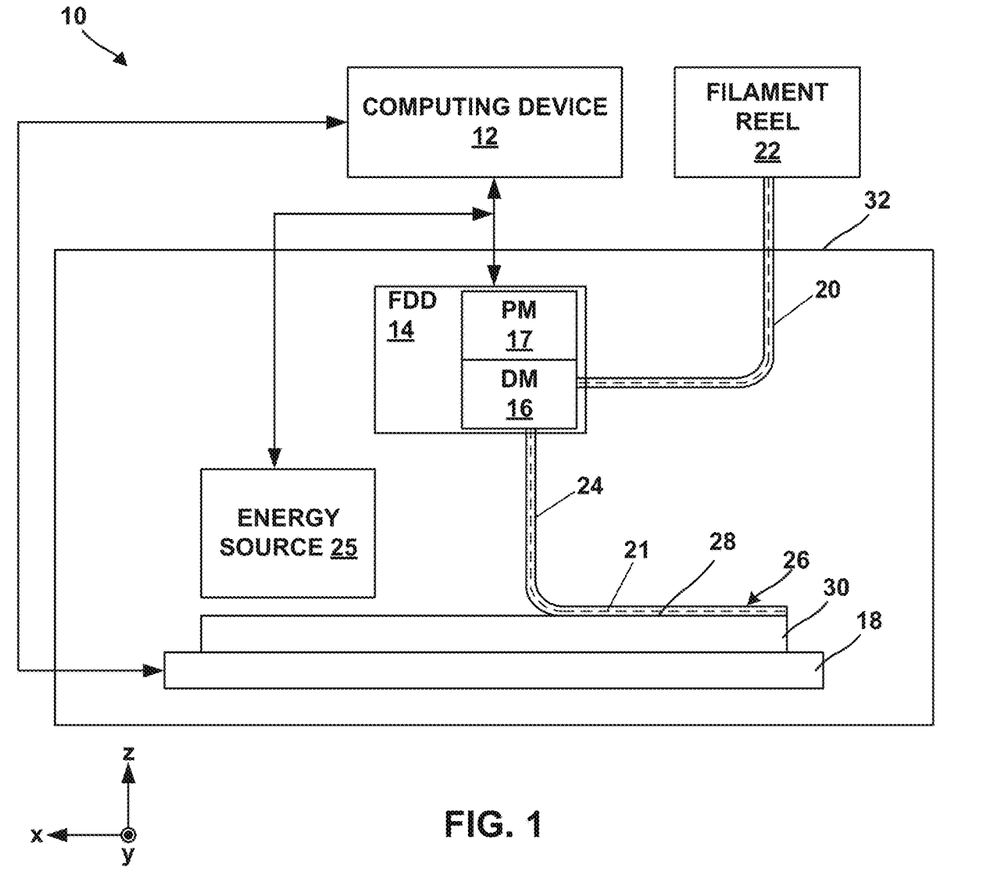
FIG. 1 is a conceptual block diagram illustrating an example system for forming an additively manufactured article by depositing a filament including aligned elongated particles and a sacrificial binder.

FIG. 1 is a conceptual block diagram illustrating an example fused filament fabrication system 10 for performing fused filament fabrication to form an additively manufactured component including a binder and a powder having elongated particles by filament delivery. Additive manufacturing system 10 may include computing device 12, filament delivery device 14, enclosure 32, and stage 18. System 10 is one example of a FFF system that may be used to form one or more of the example articles described herein.

As described in further detail below, filament 20 including elongated particles 21 and a binder (not labelled in FIG. 1) may be supplied to filament delivery device 14. The filament delivery device 14 may deposit softened filament 24 to form track 26 so that the track 26 includes a plurality of elongated particles 21 aligned with each other within track 26. The FFF process may allow for properties of the component to be tailored as described herein based on the alignment of elongated particles 21 within tracks 26 formed by the deposition of filament 20 by filament delivery device 14.

Computing device 12 may include, for example, a desktop computer, a laptop computer, a workstation, a server, a mainframe, a cloud computing system, or the like. Computing device 12 is configured to control operation of additive manufacturing system 10, including, for example, filament delivery device 14, stage 18, or both. Computing device 12 may be communicatively coupled to filament delivery device 14, stage 18, or both using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like. In some examples, computing device 12 may include control circuitry, such as one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Filament delivery device (FDD) 14 may include, for example, a delivery mechanism (DM) 16 for delivering a filament 20 to or near stage 18, and an optional positioning mechanism (PM) 18. Filament delivery device 14 may advance filament 20 from a filament reel 22 and heat filament 20 to above a softening or melting point of a component of filament 20 (e.g., a polymeric binder) to form a softened filament 24. Softened filament 24 is then extruded from delivery mechanism 16 and laid down in a track 26 on a major surface 28 of a substrate 30 (or, in subsequent layers, on a previously deposited track). The softened filament 24 cools and, in this way, may be joined to other adjacent tracks. Filament 24 may have any suitable cross-section. In some examples, filament 24 has a substantially circular cross-section with a diameter of about 0.5 millimeters (mm) to about 10 mm. The cross-sectional size of filament 24 may be less than the cross-sectional size of filament 20 in cases in which filament 20 is supplied to FDD 14 to form filament 24.

Substrate 30 may include a build plate on stage 18, or any suitable substrate defining a build surface. For example, substrate 30 may include a metal or glass plate defining a substantially planar surface. In other examples, substrate 30 may include surface features or a shaped (e.g., curved or curvilinear) surface on which the additively manufactured component is manufactured. In some examples, system 10 may not include a separate substrate 30, and filament delivery device 14 may deposit softened filament 24 on a build surface defined by stage 18, or on another component, or on layers of prior softened filament 24 or another material.

In some examples, filament delivery device 14 may, instead of receiving filament 20 from filament reel 22, include a chamber that holds a volume of a composition. The composition may be flowable, extrudable, or drawable from filament delivery device 14, for example, from delivery mechanism 16, in the form of softened filament 24 that may be deposited on or adjacent stage 18 or substrate 30. Softened filament 24 of the composition may be dried, cured, or otherwise solidified to ultimately form an additively manufactured component. In some examples, system 10 may include an energy source 25 configured to deliver energy to softened filament 24 to cure softened filament 24, for example, by photocuring or thermally curing the composition of softened filament 24.

Computing device 12 may be configured to control relative movement of filament delivery device 14 and/or stage 18 to control where filament delivery device 14 delivers softened filament 24. For example, stage 18 may be movable relative to filament delivery device 14, filament delivery device 14 may be movable relative to stage 18, or both. In some implementations, stage 18 may be translatable and/or rotatable along at least one axis to position substrate 30 relative to filament delivery device 14. For instance, stage 18 may be translatable along the z-axis shown in FIG. 1 relative to filament delivery device 14. Stage 18 may be configured to selectively position and restrain substrate 30 in place relative to stage 18 during manufacturing of the additively manufactured component.

Similarly, filament delivery device 14 may be translatable and/or rotatable along at least one axis to position filament delivery device 14 relative to stage 18. For example, filament delivery device 14 may be translatable in the x-y plane shown in FIG. 1, and/or may be rotatable in one or more rotational directions. Filament delivery device 14 may be translated using any suitable type of positioning mechanism 17, including, for example, linear motors, stepper motors, or the like.

Computing device 12 may be configured control movement and positioning of filament delivery device 14 relative to stage 18, and vice versa, to control the locations at which tracks 26 are formed. Computing device 12 may be configured to control movement of filament delivery device 14, stage 18, or both, based on a computer aided manufacturing or computer aided design (CAM/CAD) file. For example, computing device 12 may be configured to control filament delivery device 14 (e.g., positioning mechanism 17) to trace a pattern or shape to form a layer including a plurality of tracks on surface 38. Computing device 12 may be configured to control filament delivery device 14 or stage 18 to move substrate 30 away from filament delivery device 14, then control filament delivery device 14 to trace a second pattern or shape to form a second layer including a plurality of roads 26 on the first layer. Computing device 12 may be configured to control stage 18 and filament delivery device 14 in this manner to result in a plurality of layers, each layer including a traced shape or design. Together, the plurality of layers defines an additively manufactured component.

System 10 also includes an enclosure 32 that at least partially encloses filament delivery device 14 and stage 18, and optionally, energy source 25. In some examples, enclosure 32 substantially fully encloses delivery device 14 and stage 18, such that the environment within enclosure 32 may be controlled. In some examples, enclosure 32 includes or is coupled to a heat source configured to heat the interior environment of enclosure 32, a gas source and/or pump configured to control an atmospheric composition of the interior environment of enclosure 32, or the like. In this way, enclosure 32 may protect filament 20 and softened filament 24 during formation of the additively manufactured component, e.g., from unwanted chemical reactions that may change properties of the metal or alloy powder.

Filament reel 22 holds a filament 20 having a selected composition. In some examples, system 10 includes a single filament reel 22 holding a single filament 20 having a single composition. In other examples, system 10 may include multiple filament reels 22, each filament reel holding a filament 20 having a selected composition (e.g., with the selected compositions varying in terms powder material, binder material, volume or weight percent of powder and binder, ratio of elongated particles to substantially spherical particles, and/or size of elongated particles). Regardless of the number of filaments 20 and filament reels 22, in some examples, each filament may include a metal, alloy, and/or ceramic powder and a binder configured to bind the metal or alloy powder in filament 20.

As described herein, the powder of filament 20 may include particles 21 (e.g., elongated metal, alloy, and/or ceramic particles) that have an elongated, non-spherical particle shape. In some examples, respective particles 21 may have a substantially cylindrical or needle shape or elongated (prolate) spheroid shape. In some examples, the shape and size of elongated particles 21 may be such that the maximum to minimum dimension ratio is greater than 1 such as, e.g., about 2 to 1 or greater, about 4 to 1 or greater, about 5 to 1 or greater. In some examples, the shape and size of elongated particles 21 may be such that the longest dimension of the particle is greater than its mean dimension, such as the longest dimension being greater than about 200 percent of the particles mean dimension. In some examples, the aspect ratio of elongated particles 21 may be substantially constant in filament 24 used to form track 26 while in other example, the aspect ratio of elongated particles 21 may vary during the deposition process, e.g., so that one or more properties of the additively manufactured article may be tailored based on the position within the volume of the manufactured component. In some examples, the aspect ratio of particles 21 may be from about 1:1 (e.g., for a substantially spherical, non-elongated particle) to about 10:1, such as, about 5:1 to about 1:1. In some examples, particles 21 may be single crystal grain or may be amorphous. The particles 21 may be of a single crystallographic orientation.

The metal, alloy, and ceramic powder may include any suitable metal, alloy, and/or ceramic for forming an additively manufactured component. The powder may include a plurality of metal, alloy, and ceramic particles, at least some of which have an elongated shape. In some examples, the powder includes a high-performance metal or alloy particles for forming component used in mechanical systems, such as a steel (e.g., stainless steel), a nickel-based alloy, a cobalt-based alloy, a titanium-based alloy, or the like. In some examples, a metal or alloy powder may include one or more refractory metals such as, e.g., Ti, V, Cr, Mn, Zr, Nb, Mo, Tc, Ru, Rh, Hf, Ta, W, Re, Os, and Ir. In some examples, the powder may include a refractory metal or a refractory metal alloy, such as molybdenum or a molybdenum alloy (such as a titanium-zirconium-molybdenum or a molybdenum-tungsten alloy), tungsten or a tungsten alloy (such as a tungsten-rhenium alloy or an alloy of tungsten and nickel and iron or nickel and copper), niobium or a niobium alloy (such as a niobium-hafnium-titanium alloy), tantalum or a tantalum alloy, rhenium or a rhenium alloy, or combinations thereof. In some examples, the powder may include a nickel-based, iron-based, or titanium-based alloy that includes one or more alloying additions such as one or more of Mn, Mg, Cr, Si, Co, W, Ta, Al, Ti, Hf, Re, Mo, Ni, Fe, B, Nb, V, C, and Y. In some examples, the powder may include a polycrystalline nickel-based superalloy or a polycrystalline cobalt-based superalloy, such as an alloy including NiCrAlY or CoNiCrAlY. For example, the metal or alloy may include an alloy that includes 9 to 10.0 wt. % W, 9 to 10.0 wt. % Co, 8 to 8.5 wt. % Cr, 5.4 to 5.7 wt. % Al, about 3.0 wt. % Ta, about 1.0 wt. % Ti, about 0.7 wt. % Mo, about 0.5 wt. % Fe, about 0.015 wt. % B, and balance Ni, available under the trade designation MAR-M-247, from MetalTek International, Waukesha, Wis. In some examples, the metal or alloy may include an alloy that includes 22.5 to 24.35 wt. % Cr, 9 to 11 wt. % Ni, 6.5 to 7.5 wt. % W, less than about 0.55 to 0.65 wt. % of C, 3 to 4 wt. % Ta, and balance Co, available under the trade designation MAR-M-509, from MetalTek International. In some examples, the metal or alloy may include an alloy that includes 19 to 21 wt. % Cr, 9 to 11 wt. % Ni, 14 to 16 wt. % W, about 3 wt. % Fe, 1 to 2 wt. % Mn, and balance Co, available under the trade designation L605, from Rolled Alloys, Inc., Temperance, Mich. In some examples, a metal or alloy may include a chemically modified version of MAR-M-247 that includes less than 0.3 wt. % C, between 0.05 and 4 wt. % Hf, less than 8 wt. % Re, less than 8 wt. % Ru, between 0.5 and 25 wt. % Co, between 0.0001 and 0.3 wt. % B, between 1 and 20 wt. % Al, between 0.5 and 30 wt. % Cr, less than 1 wt. % Mn, between 0.01 and 10 wt. % Mo, between 0.1 and 20. % Ta, and between 0.01 and 10 wt. % Ti. In some examples, the metal or alloy may include a nickel based alloy available under the trade designation IN-738 or Inconel 738, or a version of that alloy, IN-738 LC, available from All Metals & Forge Group, Fairfield, N.J., or a chemically modified version of IN-738 that includes less than 0.3 wt. % C, between 0.05 and 7 wt. % Nb, less than 8 wt. % Re, less than 8 wt. % Ru, between 0.5 and 25 wt. % Co, between 0.0001 and 0.3 wt. % B, between 1 and 20 wt. % Al, between 0.5 and 30 wt. % Cr, less than 1 wt. % Mn, between 0.01 and 10 wt. % Mo, between 0.1 and 20 wt. % Ta, between 0.01 and 10 wt. % Ti, and a balance Ni. In some examples, the metal or alloy may include an alloy that includes 5.5 to 6.5 wt. % Al, 13 to 15 wt. % Cr, less than 0.2 wt. % C, 2.5 to 5.5 wt. % Mo, Ti, Nb, Zr, Ta, B, and balance Ni, available under the trade designation IN-713 from MetalTek International, Waukesha, Wi.

In some examples, in addition to a metal or alloy powder, the powder may include a ceramic, such as an oxide. For example, the powder may include an oxide-dispersion strengthened (ODS) alloy. The ODS alloy may include at least one of a superalloy or a particle-dispersion strengthened alloy. ODS alloys are alloys strengthened through the inclusion of a fine dispersion of oxide particles. For example, an ODS alloy may include a high temperature metal matrix (e.g., any of the metals or alloys described above) that further include oxide nanoparticles, for example, yttria ($Y_2O_3$). Other example ODS alloys include nickel chromium ODS alloys, thoria-dispersion strengthened nickel and nickel chromium alloys, nickel aluminide and iron aluminide ODS alloys, iron chromium aluminide ODS alloys. Other strengthening particles may include alumina, hafnia, zirconia, beryllia, magnesia, titanium oxide, and carbides including silicon carbide, hafnium carbide, zirconium carbide, tungsten carbide, and titanium carbide.

Powders including ODS alloys may be formed by, for example, mixing a plurality of particles of metal(s) and oxide(s) forming the ODS alloy to form a mixture, optionally melting at least part of the mixture to form a melted mixture including oxide particles, and, if the mixture is melted, atomizing the melted mixture into the powdered form. Alternatively, the powdered form of the ODS alloy may be provided by hydrometallurgical processes, or any suitable technique for preparing an ODS alloy.

In some examples, the powder of filament 20 may include a ceramic, e.g., as an alternative to a metal or alloy powder, or in combination with metal or alloy powder. In some examples, the powder may include a ceramic, such as a nitride, carbide, or oxide, or carbon. Suitable ceramic materials include, for example, a silicon-containing ceramic, such as silica ($SiO_2$), silicon carbide (SiC), and/or silicon nitride ($Si_3N_4$); alumina ($Al_2O_3$); an aluminosilicate; a transition metal carbide (e.g., WC, $Mo_2C$, TiC); a silicide (e.g., $MoSi_2$, $NbSi_2$, $TiSi_2$); combinations thereof; or the like. In some examples, the ceramic functions as a reinforcement material in a final component formed from the filament. The powder thus may include continuous or discontinuous reinforcement material. For example, the reinforcement material may include discontinuous whiskers, platelets, fibers, or particulates. Additionally, or alternatively, the reinforcement material may include a continuous monofilament or multi-filament two-dimensional or three-dimensional weave, braid, fabric, or the like, within filament 20. In some examples, the reinforcement material may include carbon (C), silicon carbide (SiC), silicon nitride ($Si_3N_4$), an aluminosilicate, silica ($SiO_2$), a transition metal carbide or silicide (e.g., WC, $Mo_2C$, TiC, $MoSi_2$, $NbSi_2$, $TiSi_2$), or the like.

In some examples, filament 20 may includes elongated particles in the form of ceramic whiskers or the like alone or in combination with metal or alloy particles, which may be elongated metal or alloy particles and/or non-elongated particles. The ceramic whiskers may be aligned within track 26 is the same or similar fashion to that of the alignment of elongated particles 21. The ceramic material may preferentially reinforce elongated particles 21 in one or more directions (e.g., the alignment direction of particles 21) after the binder has been sacrificed from tracks 26 and tracks 26 may been sintered.

Filament 20 also includes a sacrificial binder. The sacrificial binder may include a polymeric material, such as a thermoplastic. Example thermoplastics include polyvinyl alcohol, polyolefins, polystyrene, acrylonitrile butadiene styrene, polylactic acid, thermoplastic polyurethanes, aliphatic polyamides, or the like, or combinations thereof. The powder may be dispersed in the sacrificial binder, for example substantially uniformly dispersed in the sacrificial binder. In other example, the binder may be formed around a core of the powder, e.g., as a binder sleeve around a core of particles, such as elongated particles.

In some examples, the sacrificial binder may be in the form of a curable polymer precursor. The curable polymer precursor may be curable (for example, thermally curable or photocurable) to form the sacrificial binder. For example, the curable polymer precursor may be cured as softened filaments 24 are extruded and/or after softened filaments 24 are laid down in tracks 26 to form a material including the metal or alloy powder dispersed in the sacrificial binder, for example substantially uniformly dispersed in the sacrificial binder. The curable polymer precursor may include a precursor, for example, one or more monomers, oligomers, or non-crosslinked polymers suitable for forming the polymeric material of the sacrificial binder upon curing. Thus, in some examples, energy source 25 may direct energy at a curable polymer precursor, for example, in the material, to selectively cure the curable polymer precursor to form tracks 26 including the material that includes the metal or alloy powder and the sacrificial binder. In other examples, the heat to which the composition is exposed to form softened filaments 24 may initiate the curing reaction, and no additional energy source is used.

In some examples, filament 20 includes a selected amount of sacrificial binder and powder so that the material in tracks 26 may include more than about 80% by volume of the powder, which may result in a substantially rigid component with reduced porosity being formed in response to removal of the sacrificial binder. In some examples, filament 20 includes sacrificial binder in an amount configured to cause the material to shrink by less than about 20 volume percent relative to an initial volume of the material in response to removing the sacrificial binder. For example, filament 20 may include less than about 20% by volume of the sacrificial binder. In some examples, a relatively low amount of binder may be used to form a portion of an example ballistic armor article that has a relatively high density.

In some examples, filament 20 includes at least one shrink-resistant agent. For example, the at least one shrink-resistant agent may include a ceramic, instead of, or in addition to, the oxide in any ODS present in the material(s).

As described herein, in some examples, elongated particles 21 may be aligned with each other within filament 20 prior to being extruded or otherwise deposited by FDD 14. For example, filament 20 on filament reel 22 may be manufactured such that filament 20 that is supplied from filament reel 22 to FDD 14 includes elongated particles 21 aligned with each other in filament 20, e.g., that are substantially aligned with the longitudinal axis of filament 20. Additionally, or alternatively, FDD 14 may be configured to align elongated particles 21 with each other to at least some extent within softened filament 24 that is deposited out of DM 16. For example, FDD 14 may be configured such that laminar flow of softened filament 24 may occur when softened filament 24 is extruded out of DM 16. The shear forces caused by the extrusion may function to align particles 21 within softened filament 24, e.g., such that the longitudinal axis of elongated particles 21 are substantially parallel to the flow direction out of DM 16. In each instance, elongated particles 21 may be aligned with each other within track 26 formed by the deposition of softened filament out of DM 16. For example, the longitudinal axis of elongated particles 21 is the filament that forms track 26 may be substantially parallel to the longitudinal axis of track 26 and/or the tool path defined by the relative movement of FDD 14 and substrate 30 during the deposition process.

Figure 2:
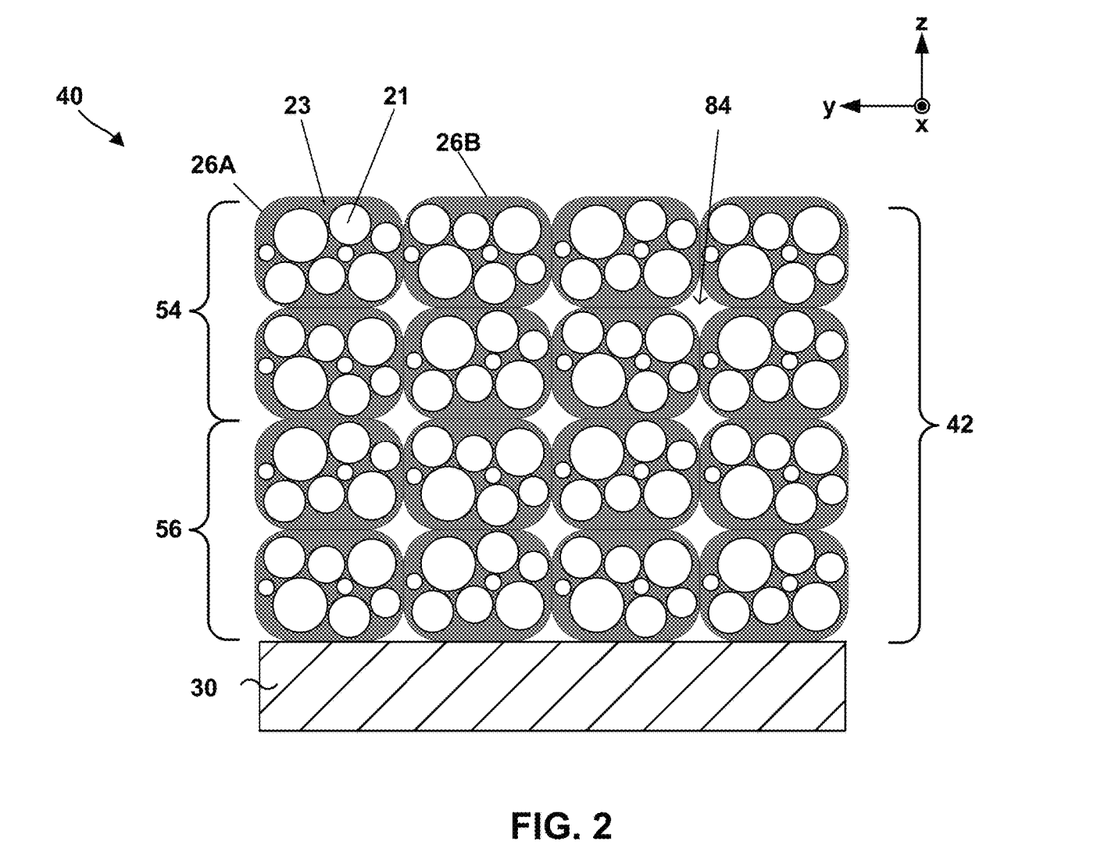
FIG. 2 is a conceptual diagram illustrating a cross-section of an example preform article formed by additive manufactured process using a filament in accordance with examples of the disclosure.

FIG. 2 is a conceptual diagram illustrating a cross-sectional view an example preform article 40 including a composite structure 42 on substrate 30. Composite structure 42 may correspond to a structure built on substrate 30 by depositing one or more tracks 26 (such as tracks 26A and 26B) of filament 24 using a FFF process but prior to the sacrificing of the binder from filament 24 and sintering the powder of filament 24. The FFF process may be carried out by system 10 of FIG. 1. Preformed article 40 may be further processed to sacrifice binder 23 from composite structure 42 to form a powder article including the powder including elongated particles 21 from filament 24 on substrate 30. The powder article may be sintered to form a sintered article. In some examples, substrate 30 may be a sacrificial substrate that is not incorporated into the final sintered article but instead provide a build surface for making article 40. Alternatively, substrate 30 may be a portion of article 40 in its final form following sacrificing the binder and sintering.

As shown in FIG. 2, composite structure 42 is formed by depositing filament 24 to forms tracks 26 that may be arranged adjacent to each other, e.g., in a four by four array of columns and rows like that shown. While a four by four array is shown for ease of illustration, it is contemplated that more or less rows and columns may be used to form article 40. Tracks 26 may be a single continuously deposited track or may be formed by multiple discrete tracks 26 of filament. Tracks 26 may have any suitable cross-section and size, which may depend on the cross-section and size of softened filament 24 deposited by DM 16. Tracks 26 may be deposited such that composite structure 42 has any desired 3D shape and size. Channels 84 in composite structure 42 may be present in areas where the filament material of tracks 26 are not in contact with each other. In some examples, channels 84 may be removed after sintering of the powders in track 82. Alternatively, composite structure 42 may be configured such that a void space remains in the areas of channels 84 after sintering in some areas of structure 42. In this manner, the density of article 40 may be decreased compared to examples in which channels 84 do not remain after composite coating is sintered.

Figure 3:
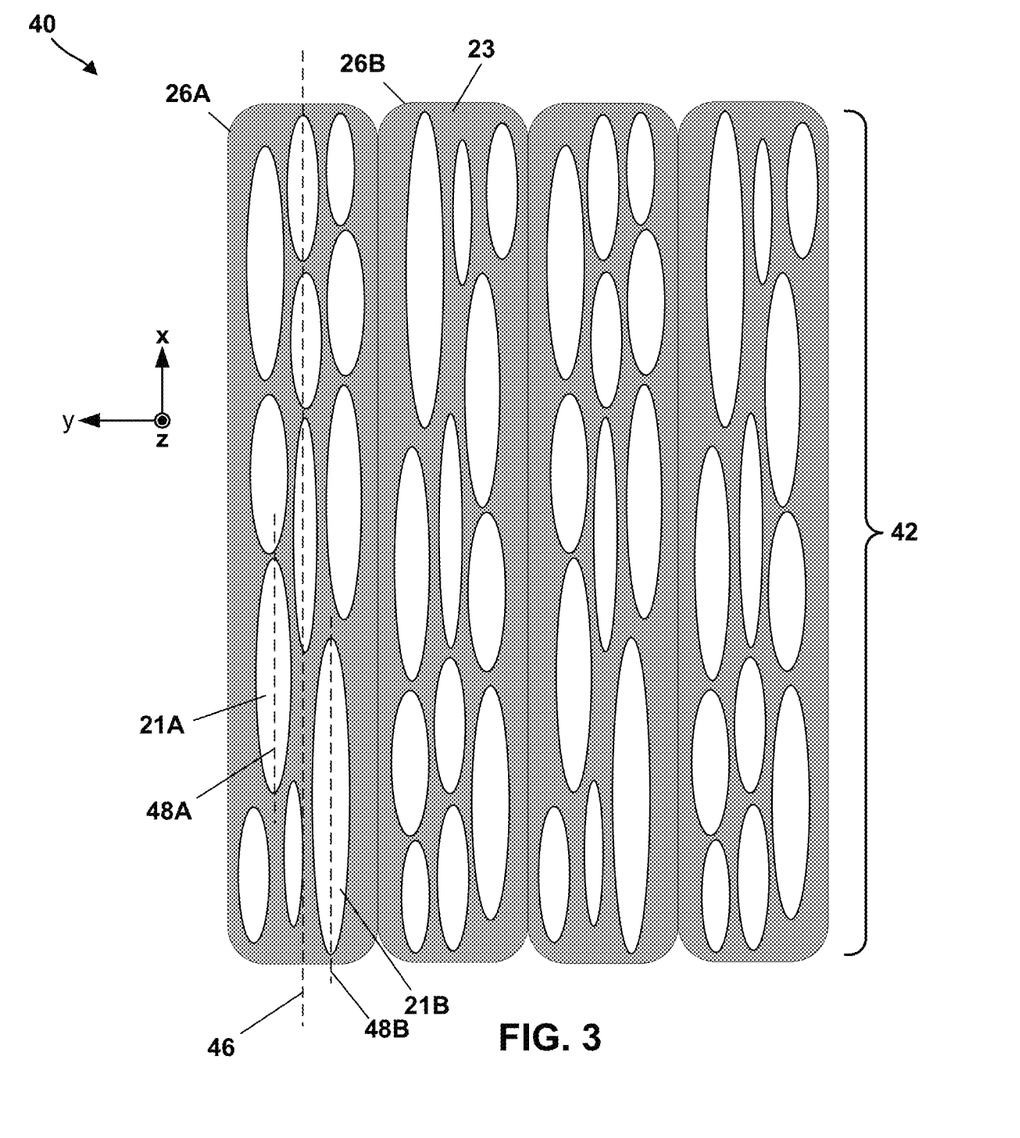
FIG. 3 is a conceptual diagram illustrating another cross-sectional view of the preform article of FIG. 2.

FIG. 3 is a conceptual diagram illustrating preform article 40 of FIG. 2 from a cross-sectional view of the top row of tracks 26 taken along the y-z plane indicated in FIG. 2. Tracks 26 of composite structure 42 each include a plurality of elongated particles 21 substantially aligned with each in binder 23. For example, track 26A includes a plurality of particles 21 such as particles 21A and 21B dispersed in binder 23, and longitudinal axis 48 of particle 21A and longitudinal axis 48B of particle 21B are substantially parallel to each other within binder 23. In some examples, elongated particles 21 may be aligned with each other such that longitudinal axis 48A of particle 21A and longitudinal axis 48B of particle 21B are within (+/−) 30 degrees of each other, such as within 15 degrees.

In some examples, elongated particles 21 of track 26A may be aligned with each other such that the longitudinal axis of elongated particles 21 are substantially aligned with longitudinal axis 46 of track 26A. For example, longitudinal axis 48A of particle 21A and longitudinal axis 48B of particle 21B may be within 30 degrees of longitudinal axis 46 of track 26A, such as within 15 degrees. In some examples, the longitudinal axis 46 of track 26A may correspond to the toolpath used when depositing filament 24 from FDD 14 to form track 26A. In some examples, particles 26 may be aligned within track 26A such that longitudinal axis 48A of particle 21A and longitudinal axis 48B of particle 21B may be within 30 degrees of the toolpath followed by FDD 14 relative to substrate 30 to deposit track 26A, such as within 15 degrees of the toolpath followed by FDD 14 relative to substrate 30 to deposit track 26A. In some examples, the toolpath may be substantially linear while in other examples, the toolpath may be a curvilinear path. As noted above, elongated particles 21A and 21B may be aligned within track 26 through the alignment of particles 21 within softened filament 24 when extruded by DM 16 and/or the filament 20 supplied to DM 16 of FDD 14 may include elongated particles 21 aligned in the manner described herein.

Elongated particles 21 of tracks 26 may have any suitable size. In some examples, elongated particles 21 may have an average particles size of less than about 2000 microns, such as about 37 microns to about 1000 microns, or an average particles size greater than about 44 microns as determined by dynamic image analysis. The amount of elongated particles 21 within filament 24 deposited to form tracks 26 may be any suitable amount, e.g., with the remainder being binder 23 and/or other types of non-elongated particles. In some examples, in some examples, filament 24 may include at least about 25 vol. % of elongated particles 21, such as about 66 vol % to about 99 vol. %. Other values are contemplated.

While the example of FIGS. 2 and 3 illustrates an example in which tracks 26 includes only elongated particles 21 aligned with each other in binder 23, in other examples, tracks 26 may include non-elongated particles in addition to elongated particles 21 in binder 23. Additionally, or alternatively, tracks 26 may include a first plurality of elongated particle 21 aligned with each other in binder 23 in addition to one or more second elongated particles not aligned with the first plurality of particles. In other examples, substantially all (e.g., greater than 90 vol. %) the particles in track 26 may be elongated particles 21 aligned in the manner described herein.

In some examples, the orientation of elongated particles 21 within track(s) 26 may impart one or more properties within the sintered article formed from preform article 40. For example, the alignment of elongated particles 21 with the tool path used to deposit tracks 26 and/or with the longitudinal axis 46 of tracks 26 may increase the creep strength of the sintered article in a direction substantially parallel to the longitudinal axis of the aligned elongated particles 21. The level of increased creep strength may be tailored within the volume of the sintered article by varying the relative amount of aligned elongated particles 21 in the tracks 26, e.g., by varying the ratio of elongated particles 26 to non-elongated particles in tracks 26, by varying the volume percent of the elongated particles 21 in tracks 26 (e.g., with the remaindering being binder 23), by varying the aspect ratio of the particles 21, and/or by varying the average particle size of the elongated particles or by varying the direction of the tracks within the build volume 21.

In some examples, one or more properties of the sintered article resulting from the alignment of elongated particles 21 in preform article 40 described herein may be substantially uniform throughout the sintered article. For example, filament 24 may be deposited such that elongated particles 21 are substantially aligned in the same direction throughout the entire volume of preform article 40, e.g., with the alignment of particles 21 being the same throughout each of the four by four array of tracks 26 shown in FIG. 2. In other examples, the one or more properties of a sintered article formed from preform article 40 may be nonuniform within the sintered article, e.g., with first portion 54 made up of the top two rows of tracks and second portion 56 made up of the bottom two rows of tracks having different properties, as a result of different relative alignment of elongated particles 21 in each portion or having one portion with aligned elongated particles 21 and the other portion not having aligned elongated particles in the respective tracks 26.

To define a gradient for a property of a sintered article resulting from preform article 40, the composition or other properties of the individual tracks 26 in composite structure 42 may be varied. For example, during the FFF process of FIG. 5 described below, the composition of the powder and/or amount of binder in filament 24 may vary such that the composition and/or amount of binder for the individual tracks 26 shown in FIGS. 2 and 3 varies. Similarly, the alignment of elongated particles 21, the amount (e.g., vol. %) of elongated particles, the ratio of elongated particles to non-elongated particles, the aspect ratio of particles 21, and/or the size of elongated particles 21 within filament 24 may vary such that the alignment of elongated particles 21, the amount (e.g., vol. %) of elongated particles, ratio of elongated particles to non-elongated particles, aspect ratio of particles 21, and/or the size of elongated particles 21 in the individual tracks 26 show in FIGS. 2 and 3 varies.

The variance may be used to tailor the properties of a sintered article formed from preform article 40 as described herein. For example, the bottom two rows of tracks 26 defining portion 56 may have a different ratio of elongated particles to non-elongated particles in binder 23 compared to the top two rows of tracks 26 in composite structure 42 defining portion 54 so that the properties of the sintered article formed from preform article 40 are different near the top surface (surface opposite substrate 30) compared to nearer the underlying portion of the sintered article after sacrificing the binder and sintering the powder of composite structure 42. As another example, the bottom two rows of tracks 26 defining portion 56 may have elongated particles with a greater average aspect ratio (more elongated) in binder 23 compared to the top two rows of tracks 26 in composite structure 42 defining portion 54 so that the properties of the sintered article formed from preform article 40 are different near the top surface (surface opposite substrate 30) compared to nearer the underlying portion of the sintered article after sacrificing the binder and sintering the powder of composite structure 42. In this way, using a FFF process to form article 40 may be beneficial, e.g., as compared to other technique for forming a sintered component without aligned elongated particles in at least some portion of the sintered article. Additionally, or alternatively, the use of a FFF process may allow for the use of dissimilar materials to form preform article 40, e.g., those materials that may be readily melted or fused to each other.

In the example of FIGS. 2 and 3, composite structure 42 may be formed by depositing tracks 26 while following a substantially linear tool path (e.g., a direction generally parallel the x-direction indicated in FIGS. 1-3). Thus, for tracks 26 formed from filament 26 including elongated particles 21 aligned with the longitudinal direction of filament 26, elongated particles 21 may have a linear alignment within composite structure 42.

In other examples, a non-linear or curvilinear toolpath may be employed by FDD 14 to deposit filament 24 when forming tracks 26 so that elongated particles 21 have a non-linear alignment within composite structure 42. For example, a radial or curvilinear toolpath may be employed by FDD 14 when depositing filament 24. This may allow for the formation of a sintered article from preform article 40 having a curved outer surface (e.g., in the case of a vane of a combustion engine), where the elongated particles are aligned within the volume of the sintered article is a direction substantially parallel to the curved outer surface. This may allow for a sintered article having improved creep resistance against a force parallel to the surface of the sintered article.

Elongated particles 21 may be formed using any suitable technique. In some examples, the particular technique used to form elongated particles 21 may depend on the shape and/or size desired for elongated particles 21. In some examples, elongated particles 21 may be formed by a melt spinning process. The melt spinning process may include depositing a molten material (e.g., molten metal) onto a rotating platen that may be internally cooled. The molten metal may cool while under the influence of the radial forces applied by the rotating platen and/or may be flung off the rotating platen by the rotational forces to produce thin ribbons of material. The size and shape of the thin ribbons of material may be controlled by controlling the operating parameters of the melt spinning system. In some examples, particles 21 may be an entire ribbon or may be a portion of such a ribbon.

Additionally, or alternatively, elongated particles 21 may be formed by a suitable machining process. In some examples, such a machining process may include a modulated assisted machining process. Examples of such a process may include one or more of the examples described in U.S. Pat. No. 7,628,099 to Mann et al. for forming chips having the desired shapes and sizes for particles 21 described herein.

Additionally, or alternatively, elongated particles 21 may be formed by cutting an elongated wire (e.g., metal or alloy wire) into discrete section having a desired length. The metal wire may be formed by casting or other suitable techniques, In the example of FIGS. 2 and 3, filament 24 deposited to form tracks 26 may be formed by dispersing or mixing elongated particles 21 in binder 23 and then extruding the mixture out of DM 16 as softened filament 24. Similar techniques may be used to form filament 20 on filament reel for examples in which a prefabricate filament 20 is supplied to FDD 14 for deposition.

Figure 4A:
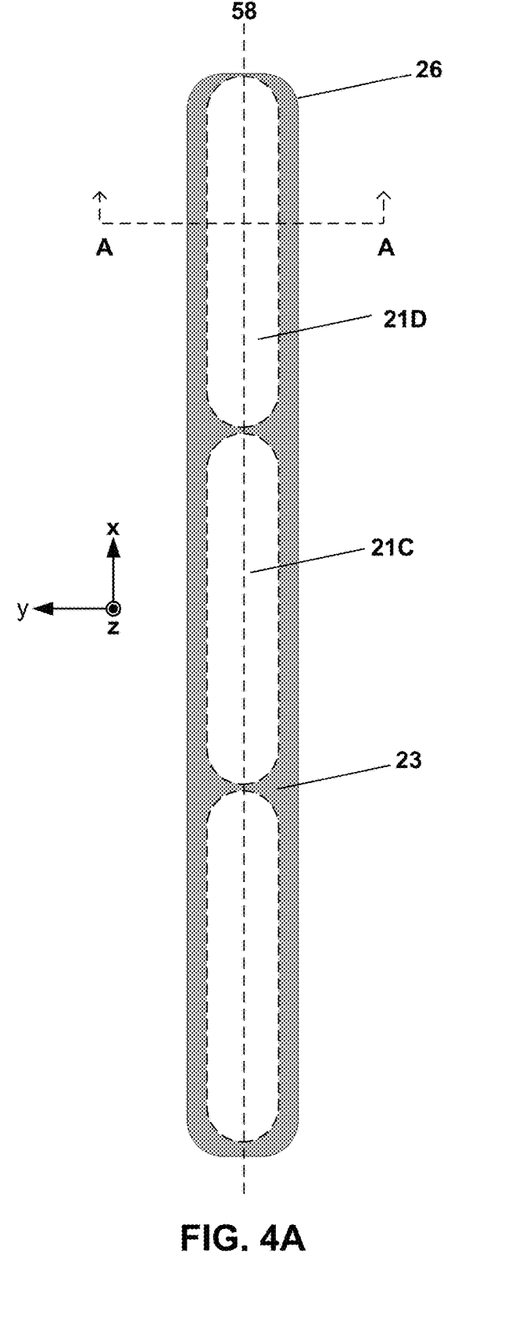
FIG. 4A is a conceptual diagram illustrating an example filament including elongated particle and sacrificial binder in accordance with examples of the disclosure.
Figure 4B:
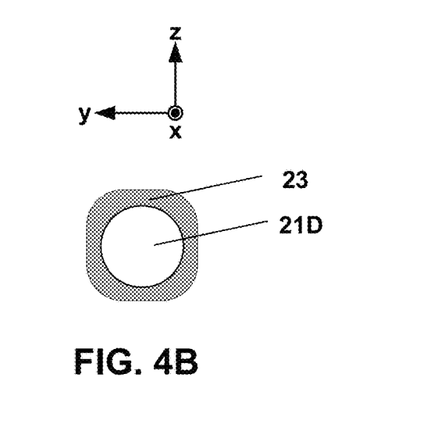
FIG. 4B is a conceptual diagram illustrating a cross-sectional view of the example filament in FIG. 4A along cross-section A-A.

In some examples, filament 24 may include binder surrounding elongated particles 21, where filament 24 includes single particles 21 aligned along the longitudinal axis of filament 24 and that are coated or otherwise surrounded by binder 23. FIGS. 4A and 4B are conceptual diagrams of an example track 26 formed by depositing such an example filament. Track 26 is an example of a track that may be deposited by system 10 to form a composite structure such as composite structure 42 shown in FIG. 2. FIG. 4A shows track 26 from a top view, where track 26 has been formed by depositing filament 24 along a toolpath that is substantially parallel to the x-axis indicated in FIG. 4A. As shown, particles 21 such as particles 21C and 21D are aligned within each other about the longitudinal axis 58 of track 26 in a single particle by single particle fashion. FIG. 4B shows a cross-sectional view of track 26 of FIG. 4A along cross-section A-A. As shown in FIG. 4B, binder 23 surrounds single particle 21D to form track 26. In such an example, each track 26 is formed of a row of individual particles 21 aligned with each other, e.g., as compared to the tracks 26 shown in FIGS. 2 and 3 where respective individual tracks 26 have multiple particles 21 are dispersed in binder 23 moving in the axial direction (or the direction of the toolpath followed when depositing filament 24). When the particles 21 and binder are extruded out of DM 16 to deposit filament 24, a single particle such as particle 21C or 21D may pass through the nozzle of DM 16 at a time rather than a plurality of particles. As described herein, in some examples, the extrusion of the binder 23 and particles 21 by DM 16 may function to align particles 21 in binder 23 so that particles 21 may be aligned in the manner described.

Figure 5:
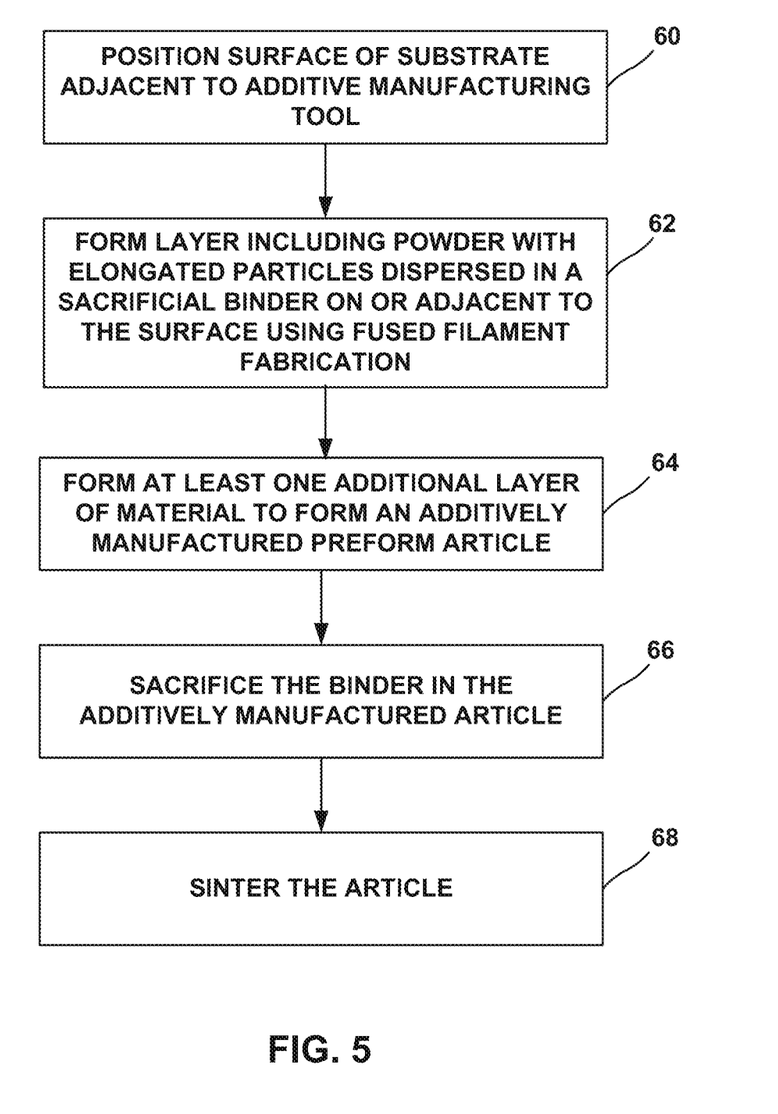
FIG. 5 is a flow diagram illustrating an example technique for forming an additively manufactured article using fused filament fabrication in accordance with examples of the disclosure.

FIG. 5 is a flow diagram illustrating an example technique for forming an additively manufactured article using a filament having aligned, elongated particles in a binder. For ease of description, the technique of FIG. 5 is described with respect to system 10 of FIG. 1 forming preform article 40 of FIG. 2. In other examples, the technique of FIG. 5 may be performed by other systems, such a system fewer or more components than those illustrated in FIG. 1. Similarly, system 10 may be used to performed other additive manufacturing techniques.

The technique of FIG. 5 includes positioning substrate 30 including surface 28 adjacent to a build position, e.g., on stage 18 (60). In some examples, system 10 may not include a separate substrate 30, the technique of FIG. 5 may include positioning a build surface defined by stage 18, or by another component, or layers of prior softened filament 24 or another material.

The technique of FIG. 5 also includes forming a track 26 of material using fused filament fabrication (62). Computing device 12 may cause filament delivery device 14 to deposit softened filament 24 in one or more tracks 26 to ultimately form the additively manufactured article. A plurality of tracks 26 defining a common plane may define a layer of material. Thus, successive tracks 26 may define a series of layers, for example, parallel layers, and the series of layers may eventually define the additively manufactured article. As described herein, filament 24 may include binder 23 and a powder including elongated particles 21, wherein the elongated particles are aligned with each other in filament 24.

The technique of FIG. 5 also includes forming, on tracks 26 of material, at least one additional layer of material to form an additively manufactured article (64). For example, computing device 12 may control movement and positioning of filament delivery device 14 relative to stage 18, and vice versa, to control the locations at which tracks are formed by following a desired toolpath. Computing device 12 may control movement of filament delivery device 14, stage 18, or both, based on a computer aided manufacturing or computer aided design (CAM/CAD) file. For example, computing device 12 may control filament delivery device 14 to trace a pattern or shape to form a layer including a plurality of tracks 26 on surface 28. Computing device 12 may control filament delivery device 14 or stage 18 to move substrate 30 away from filament delivery device 14, then control filament delivery device 14 to trace a second pattern or shape to form a second layer including a plurality of tracks on the previously deposited layer. Computing device 12 may control stage 18 and filament delivery device 14 in this manner to result in the plurality of layers, each layer including a traced shape or design. Together, the plurality of layers defines an additively manufactured article (64), such as article 40 of FIG. 2. Prior to sacrificing binder 23 and sintering the powder including particles 21, the article may be referred to as a preform article.

Computing device 12 may also control the deposition process so that elongated particles 21 are present within all or selected volumes of the resulting composite article 42, e.g., in a desired alignment relative to the overall shape of the desired article. System 10 may implement one or more the example techniques described in U.S. patent application Ser. No. 16/797,718 by Nelson et al., filed Feb. 21, 2020, to selectively deposition filament 24 in a manner that provides for elongated particles 21 to be aligned as desired within the overall volume of the composited structure 42 of preform article 40.

The technique of FIG. 5 includes, after forming the additively manufactured preform article (64), sacrificing binder 23 from the article, e.g., to debind the article (66). The sacrificing (66) may include delivering thermal or any suitable energy, for example, by energy source 25, to tracks 24 in an amount sufficient to cause binder to be substantially oxidized, incinerated, carbonized, charred, decomposed, or otherwise removed from tracks 24, while leaving the metal or alloy powder substantially intact. In other examples, the additively manufactured article may be placed in a furnace to heat the additively manufactured component and cause removal of the binder from the article (66). In other example, binder 23 may be sacrificed using a catalyst debinding process. After binder 23 is sacrificed, the article may be referred to as a powder article.

The technique of FIG. 5 also includes, after sacrificing the binder (66), sintering the article (68). The sintering may include a thermal treatment, for example, one or more predetermined cycles of exposure to predetermined temperatures for predetermined times. In some examples, energy source 25 may deliver energy to cause sintering. In other examples, the additively manufactured article may be placed in a furnace to heat the additively manufactured component and cause sintering. In some examples, the sintering (CC) may promote the bonding of particles of powder, including particles 21, to each other to strengthen the component including substantially only the powder after the binder is sacrificed. Sintering may not melt the particles of powder, thus leaving the microstructure of the particles substantially intact. This may facilitate forming articles with selected microstructures compared to techniques that include melting the powder. The sintering (68) may also densify an interior or a surface region of the component, for example, by promoting powder compaction and reducing porosity. In some examples, the steps of removing the sacrificial binder (66) and sintering the component (68) may be combined in a single heating step or series of heating steps, e.g., within a furnace.

Following sintering, the remaining article may be referred to as a sintered article. The sintered article may exhibit one or more anisotropic properties resulting from the alignment of particles 21 within tracks 26 deposited to form the preform article. As described herein, aligned elongated particles 21 may be selectively provided within the preform component so that that sintered article exhibits properties such as increased creep resistance in the volume(s) of the sintered article including the aligned elongated particles (e.g., in a direction normal to the alignment axis).

The systems and techniques described herein may be used to form any suitable articles. In some examples, the systems and techniques may be used to form articles used in aerospace systems, such as high temperature combustion engines. In some examples, the sintered article may include a component of a mechanical system, a shaft, a gear, a bearing component, or transmission component. In some examples, the sintered article may be a component of a high temperature mechanical system such as a gas turbine engine. In some examples, sintered article may be an airfoil, blade, vane or other turbine engine component such as rings, casing, nozzles, segments, and the like. The additive process may be used to form a new component from the sintered article or the additive process may be used to repair an existing component that has been damaged or modify an existing component.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following clause and claims.

Clause 1. A method comprising depositing a filament via a filament delivery device to form at least one track of the deposited filament, the at least one track of the deposited filament forming at least a portion of a preform article, wherein the filament includes a sacrificial binder and a powder, wherein the powder includes a plurality of elongated particles with each respective particle defining a longitudinal axis, wherein the longitudinal axes of the plurality of particles are substantially aligned with each other within the at least one track of the deposited filament; removing substantially all the binder from the at least one track of the preform article to form a powder article; and sintering the powder article to form a sintered article.

Clause 2. The method of clause 1, wherein the at least one track defines a longitudinal axis as deposited, and wherein the longitudinal axes of the plurality of elongated particles are substantially aligned along the longitudinal axis of the at least one track as deposited.

Clause 3. The method of clause 1 or 2, wherein depositing the filament via the filament delivery device comprises extruding the filament from a filament delivery device, wherein the extrusion of the filament at least partially aligns the longitudinal axes of the plurality of elongated particles of the filament with a longitudinal axis of the filament as extruded.

Clause 4. The method of any one of clauses 1-3, wherein depositing the filament via the filament delivery device comprises extruding the filament from a filament delivery device, and wherein the filament supplied to the filament delivery device for extrusion includes the plurality of elongated particles having the longitudinal axes being substantially aligned with a longitudinal axis of the filament.

Clause 5. The method of any one of clauses 1-4, wherein depositing the filament via the filament delivery device comprises depositing the filament such that the at least one track including the plurality of elongated particles having the longitudinal axes substantially aligned with each other define a first portion of the sintered article after removing substantially all the binder and sintering, wherein the first portion of the sintered article exhibits at least one property different than a second portion of the article that is separate from the first portion.

Clause 6. The method of clause 5, wherein the at least one property includes creep strength.

Clause 7. The method of any one of clauses 1-6, wherein the powder includes a plurality of substantially spherical particles with the plurality of elongated particles.

Clause 8. The method of any one of clauses 1-7, wherein the plurality of elongated particles define an average aspect ratio of about 4 to 1 or greater.

Clause 9. The method of any one of clauses 1-8, wherein the plurality of elongated particles comprises at least one of metal, alloy, or ceramic particles.

Clause 10. The method of any one of clauses 1-9, wherein the filament includes ceramic whiskers with the plurality of elongated particles.

Clause 11. The method of any one of clauses 1-10, wherein depositing a filament via a filament delivery device to form at least one track of the deposited filament comprise depositing the filament along a curvilinear toolpath.

Clause 12. The method of any one of clauses 1-11, wherein the plurality of elongated particles includes single crystal particles.

Clause 13. The method of any one of clauses 1-12, wherein the plurality of elongated particles are formed by at least one of modulated assisted machining or melt spinning techniques.

Clause 14. The method of any one of clauses 1-13, wherein the filament includes the plurality of elongated particles dispersed in the binder.

Clause 15. The method of any one of clauses 1-14, wherein the filament includes the plurality of elongated particles surrounded by the binder.

Clause 16. The method of any one of clauses 1-15, wherein the sintered article forms a turbine vane, casing, or nozzle.

Clause 17. An article comprising a composite structure on a substrate, the composite structure formed by at least one track, wherein the at least one track is formed by depositing a filament via a filament delivery device, wherein the filament includes a sacrificial binder and a powder, wherein the powder includes a plurality of elongated particles with each respective particle defining a longitudinal axis, wherein the longitudinal axes of the plurality of particles are substantially aligned with each other within the at least one track of the deposited filament.

Clause 18. The article of clause 17, wherein the at least one track defines a longitudinal axis as deposited, and wherein the longitudinal axes of the plurality of elongated particles are substantially aligned along the longitudinal axis of the at least one track as deposited.

Clause 19. The article of any one of clauses 17 or 18, wherein the at least one track including the plurality of elongated particles having the longitudinal axes substantially aligned with each other define a first portion of the article after removing substantially all the sacrificial binder and sintering the article, wherein the first portion of the sintered article exhibits at least one property different than a second portion of the article that is separate from the first portion.

Clause 20. The article of clause 19, wherein the at least one property includes creep strength.

Clause 21. The article of any one of clauses 17-20, wherein the powder includes a plurality of substantially spherical particles with the plurality of elongated particles.

Clause 22. The article of any one of clauses 17-21, wherein the plurality of elongated particles define an average aspect ratio of about 4 to 1 or greater.

Clause 23. The article of any one of clauses 17-22, wherein the plurality of elongated particles comprises at least one of metal, alloy, or ceramic particles.

Clause 24. The article of any one of clauses 17-23, wherein the filament includes ceramic whiskers with the plurality of elongated particles.

Clause 25. The article of any one of clauses 17-24, wherein the plurality of elongated particles includes single crystal particles.

Clause 26. The article of any one of clauses 17-25, wherein the filament includes the plurality of elongated particles dispersed in the binder.

Clause 27. The article of any one of clauses 17-26, wherein the filament includes the plurality of elongated particles surrounded by the binder.

Clause 28. An additive manufacturing system comprising: a filament delivery device; and a computing device configured to: control the filament delivery device to deposit a filament on a surface to form at least one track of the deposited filament, the at least one track of the deposited filament forming at least a portion of a preform article, wherein the filament includes a sacrificial binder and a powder, wherein the powder includes a plurality of elongated particles with each respective particle defining a longitudinal axis, wherein the longitudinal axes of the plurality of particles are substantially aligned with each other within the at least one track of the deposited filament.

What is claimed is:

1. A method comprising:
depositing a filament via a filament delivery device to form at least one track of the deposited filament, the at least one track of the deposited filament forming at least a portion of a preform article, wherein the filament includes a sacrificial binder and a powder, wherein the powder includes a plurality of elongated particles with each respective particle defining a longitudinal axis, wherein the longitudinal axes of the plurality of particles are substantially aligned with each other the at least one track of the deposited filament;
removing substantially all the binder from the at least one track of the preform article to form a powder article; and
sintering the powder article to form a sintered article,
wherein the filament includes a plurality of substantially spherical particles with the plurality of elongated particles,
wherein depositing the filament via the filament delivery device to form at least one track of the deposited filament includes forming a first portion defined at least in part by a first track of deposited filament and forming a second portion defined at least in part by a second track of deposited filament, and
wherein depositing the filament includes varying a ratio of the plurality of elongated particles to the plurality of substantially spherical particles such that the first portion includes a first ratio of the elongated particles to the substantially spherical particles and the second portion includes a second ratio of the elongated particles to the substantially spherical particles different from the first ratio.

2. The method of claim 1, wherein the at least one track defines a longitudinal axis as deposited, and wherein the longitudinal axes of the plurality of elongated particles are substantially aligned along the longitudinal axis of the at least one track as deposited.

3. The method of claim 1, wherein depositing the filament via the filament delivery device comprises extruding the filament from a filament delivery device, wherein the extrusion of the filament at least partially aligns the longitudinal axes of the plurality of elongated particles of the filament with a longitudinal axis of the filament as extruded.

4. The method of claim 1, wherein depositing the filament via the filament delivery device comprises extruding the filament from a filament delivery device, and wherein the filament supplied to the filament delivery device for extrusion includes the plurality of elongated particles having the longitudinal axes being substantially aligned with a longitudinal axis of the filament.

5. The method of claim 1, wherein, following the sintering, the first portion of the sintered article exhibits at least one property different than a second portion of the article that is separate from the first portion.

6. The method of claim 5, wherein the at least one property includes creep strength.

7. The method of claim 1, wherein the plurality of elongated particles define an average aspect ratio of about 4 to 1 or greater.

8. The method of claim 1, wherein the plurality of elongated particles comprises at least one of metal, alloy, or ceramic particles.

9. The method of claim 1, wherein the filament includes ceramic whiskers with the plurality of elongated particles.

10. The method of claim 1, wherein depositing a filament via a filament delivery device to form at least one track of the deposited filament comprise depositing the filament along a curvilinear toolpath.

11. The method of claim 1, wherein the plurality of elongated particles includes single crystal particles.

12. The method of claim 1, wherein the plurality of elongated particles are formed by at least one of modulated assisted machining or melt spinning techniques.

13. The method of claim 1, wherein the filament includes the plurality of elongated particles dispersed in the binder.

14. The method of claim 1, wherein the filament includes the plurality of elongated particles surrounded by the binder.

15. The method of claim 1, wherein the sintered article forms a turbine vane, casing, or nozzle.

16. The method of claim 1, wherein the filament includes a first filament including the first ratio of the elongated particles to the substantially spherical particles and a second filament including the second ratio of the elongated particles to the substantially spherical particles, wherein forming the first portion includes depositing the first filament to form the first track, and wherein forming the second portion includes depositing the second filament to form the second track.

17. The method of claim 1, wherein a volume percent of the plurality of elongated particles in the first track of deposited filament is different than a volume percent of the plurality of elongated particles in the second track of deposited filament.

18. The method of claim 1, wherein an aspect ratio of the plurality of elongated particles in the first track of deposited filament is different than an aspect ratio of the plurality of elongated particles in the second track of deposited filament.

19. The method of claim 1, wherein a volume percent of the plurality of elongated particles in the first track of deposited filament is different than a volume percent of the plurality of elongated particles in the second track of deposited filament.

20. The method of claim 1, wherein, following the sintering, the first portion defines an outer surface of the sintered article.

* * * * *